US011560863B1

(12) United States Patent
Ramberg

(10) Patent No.: US 11,560,863 B1
(45) Date of Patent: Jan. 24, 2023

(54) POWERTRAIN CONTROL UNIT THAT CONTROLS POLLUTANTS ACCORDING TO ENGINE LOCATION, AND A VEHICLE OR EQUIPMENT COMPRISING THE POWERTRAIN CONTROL UNIT

(71) Applicant: Bresbo AB, Karlstad (SE)

(72) Inventor: Charles E. Ramberg, Karlstad (SE)

( * ) Notice: Subject to any disclaimer, the term of this patent is extended or adjusted under 35 U.S.C. 154(b) by 107 days.

(21) Appl. No.: 16/198,839

(22) Filed: Nov. 22, 2018

Related U.S. Application Data

(62) Division of application No. 14/935,392, filed on Nov. 7, 2015, now Pat. No. 10,138,835, and a division of application No. 13/743,357, filed on Jan. 17, 2013, now abandoned, and a division of application No. 12/824,070, filed on Jun. 25, 2010, now Pat. No.
(Continued)

(51) Int. Cl.
| | | |
|---|---|---|
| *F02D 41/14* | (2006.01) | |
| *F02D 35/00* | (2006.01) | |
| *B60W 10/06* | (2006.01) | |
| *B60W 20/40* | (2016.01) | |
| *B60W 30/18* | (2012.01) | |

(Continued)

(52) U.S. Cl.
CPC ......... *F02D 41/1461* (2013.01); *B60W 10/06* (2013.01); *B60W 10/08* (2013.01); *B60W 20/40* (2013.01); *B60W 30/1882* (2013.01); *F02D 35/0015* (2013.01); *B60W 2710/06* (2013.01)

(58) Field of Classification Search
CPC ............. F02D 41/1401; F02D 41/1406; F02D 41/1451; F02D 41/1459; F02D 41/1461; F02D 41/1462; F02D 35/0015; F02D 2041/1412; B60W 10/06; B60W 10/08; B60W 30/1882; B60W 20/40; B60W 2710/06; Y02T 10/12
USPC .......................................... 60/274, 277, 286
See application file for complete search history.

(56) References Cited

U.S. PATENT DOCUMENTS

| | | | | |
|---|---|---|---|---|
| 7,268,442 B2 * | 9/2007 | Syed | ....................... | F02D 29/06 290/40 C |
| 7,503,166 B2 * | 3/2009 | Jankovic | ............. | F02D 41/3041 60/285 |
| 8,359,829 B1 * | 1/2013 | Ramberg | ............ | F02D 41/1453 60/285 |

OTHER PUBLICATIONS

EPA Enforcement Alert, vol. 1, No. 2, published by the US EPA, EPA 300-N-98-005, Aug. 1998.
(Continued)

*Primary Examiner* — Audrey B. Walter
*Assistant Examiner* — Dapinder Singh
(74) *Attorney, Agent, or Firm* — Bresbo AB

(57) ABSTRACT

A powertrain control unit may be configured to control an engine and identify a first operating condition is expected to fulfill a demand for output with an exhaust stream having a first amount of a pollutant (e.g., NOx, particulate matter), and a second operating condition expected to fulfill the demand with an exhaust stream having a reduced amount of the pollutant as compared to the first amount. The powertrain control unit may receive duty cycle information to control the engine to fulfill the demand per the second operating condition, yielding the reduced amount of pollutant in the exhaust. Duty cycle information may include speed, location, position, rotation, temperature, and/or other information. A vehicle, backhoe, bulldozer, crane, and/or combine harvester may comprise the powertrain control unit and an engine and aftertreatment system. An exhaust after-
(Continued)

treatment system may be remotely activated, which may reduce warmup time associated with emissions mitigation.

20 Claims, 11 Drawing Sheets

Related U.S. Application Data 8,359,829, and a division of application No. 61/220,200, filed on Jun. 25, 2009.

(51) Int. Cl.
*B60W 30/188* (2012.01)
*B60W 10/08* (2006.01)

(56) References Cited

OTHER PUBLICATIONS

Consent Decree, US District Court for the District of Columbia, *US vs. Ford Motor Company*, May 1998.

\* cited by examiner

POWERTRAIN CONTROL UNIT THAT CONTROLS POLLUTANTS ACCORDING TO ENGINE LOCATION, AND A VEHICLE OR EQUIPMENT COMPRISING THE POWERTRAIN CONTROL UNIT

CROSS REFERENCE TO RELATED APPLICATIONS

This application is a Division of U.S. patent application Ser. No. 14/935,392 filed Nov. 7, 2015, now U.S. Pat. No. 10,138,835, which is a Division of U.S. patent application Ser. No. 13/743,357, filed Jan. 17, 2013 now abandoned, which is a Division of U.S. patent application Ser. No. 12/824,070, filed Jun. 25, 2010, now U.S. Pat. No. 8,359,829, which claims the priority benefit of U.S. provisional patent application No. 61/220,200, filed Jun. 25, 2009 and entitled "Powertrain Controls," the disclosures of which are incorporated by reference herein.

BACKGROUND

1. Technical Field

The present invention relates generally to reducing the impact of emissions from engines, turbines, boilers, furnaces, and the like.

2. Description of Related Art

Engines, turbines, boilers, furnaces, and the like typically create emissions streams resulting from combustion. Reducing the local and/or global impact of combustion may require the mitigation (e.g., reduction and/or elimination) of one or more emitted species from the emissions stream.

Emissions streams may include "criteria pollutants" and/or pollutants such as particulate matter (soot), nitrogen oxides (NOx), carbon monoxide (CO), hydrocarbons, and the like. Emissions streams may include global warming pollutants (e.g., CO2). Some species (e.g., soot, NOx) may be criteria pollutants and global warming pollutants.

Some existing hybrid powertrains combine an electric motor and an engine. In some configurations, the motor and engine may operated together in an effort to minimize fuel consumption. However, some applications may require minimization of pollutants (e.g., pollutants other than CO2).

The relative impact of one pollutant vs. another may vary as a function of location (e.g., urban vs. countryside), time (rush hour vs. late night), time of year, and the like. For example, the respiratory health of a worker at a toll booth may be more impacted by criteria pollutants than CO2 emissions. Minimizing an integrated or overall impact of an emissions stream may provide for improved local, regional, and global health. An ability to "change the mix" of emitted species might reduce the impact of a powertrain.

SUMMARY OF THE INVENTION

Various aspects provide for reducing emissions from exhaust streams. A powertrain may comprise an engine and control circuitry, and may be configured to fulfill a demand for output associated with a load on the powertrain. In some cases, a powertrain includes a motor coupled to at least one of the engine and the load. The engine and motor may be coupled (e.g., with a clutch). Certain embodiments include an onboard energy soppy (e.g., a fuel tank, a battery, an ultracapacitor, a solar cell, and the like). Some embodiments may be attached to line power (e.g., an electrical grid) and/or a gas line (e.g., a natural gas line).

A method for operating a powertrain may include receiving a demand for output. A first emissions profile associated with fulfilling the demand under a first operating condition may be determined, predicted, and/or calculated. The first emissions profile may characterize one or more pollutants in an exhaust stream emitted from the engine during operation according to the first operating condition. A second operating condition may be determined, which may be associated with a second predicted emissions profile. The second emissions profile may have a reduced concentration of at least one pollutant as compared to the first emissions profile. The demand may be fulfilled according to the second operating condition.

In some cases, the reduced pollutant may be at least one of soot (or Black Carbon, particulate matter, and the like), NOx, CO, and CO2. In some cases the second emissions profile may have an increased amount of one pollutant (as compared to the first emissions profile) and have a reduced amount of another pollutant. In certain embodiments, the second profile may have an increased amount of CO2 as compared to the first profile and a reduced amount of at least one of soot and NOx as compared to the first profile.

In some embodiments, a demand for output is fulfilled with combination of output from a motor and an engine. In some combinations, an overall and/or integrated impact of an emissions stream is reduced by reducing a concentration of a first pollutant. In certain cases, emission of a less harmful pollutant may be increased in order to decrease an emitted amount of a more harmful pollutant. Some embodiments incorporate location, time, and/or duty cycle information in the minimization of environmental impact. In some aspects, a pollutant having a higher toxicity (e.g., soot) is reduced in locations of higher population and/or closer proximity to the emission.

A method of operating a powertrain may include activating an aftertreatment system associated with the powertrain in concert with the receipt of a demand for output from the powertrain. Activation may include heating the aftertreatment system, injecting a substance into the activation system, and/or otherwise preparing or preconditioning the aftertreatment system. In some cases, an aftertreatment system may be activated prior to a demand for output. In some cases, the demand for output activates the aftertreatment system. In some embodiments, a powertrain may include an energy supply (e.g., a battery), an engine, a generator, and an aftertreatment system. The battery may activate the aftertreatment system, and may be recharged by the generator. In some cases, an initial demand for output from a cold powertrain may be fulfilled by the battery (e.g., while the aftertreatment system warms up). Upon sufficient activation of the aftertreatment system, the engine may be activated. The engine may fulfill the demand for output and/or recharge the battery.

A system for reducing a concentration of a pollutant in an exhaust stream may provide for "remote" exhaust mitigation (e.g., of an engine having otherwise "unmitigated" or less mitigated emissions). A system may include an aftertreatment device including a container having an inlet and an outlet, and a substrate within the container, disposed to interact with an exhaust stream passing between the inlet and the outlet. The substrate may have chemical and/or physical properties (e.g., porosity, composition, adsorptive, absorptive, catalytic, crystallographic, and/or other properties) that reduce the concentration of a pollutant in a gas stream interacting with the substrate. A hose may have a first end attached to the inlet of the container. The hose may have a second end configured to be disposed near and/or attach to a tailpipe emitting an exhaust stream (or otherwise "gather" the exhaust stream). In some embodiments, the hose may include a fitting to removably attach to a tailpipe. The system may include a suction device (e.g., a fan, a pump, bellows, and the like) configured to draw gases (e.g., the exhaust stream) into the aftertreatment system. In some cases, the suction device may be disposed at the outlet. The system may include a heater, which may be configured to increase the temperature of components interacting with the exhaust stream. In some embodiments, the substrate may include a particulate filter, a NOx trap, a lean-NOx catalyst, and/or an SCR system. A heater may be disposed in a manner that heats the substrate, which may provide an "early warmup" of the substrate. The heater may be disposed in a manner that alters gas flow through the substrate (e.g., disposed in a region of a filter that preferentially clogs with soot, or disposed in a region that tends to be the "last region to clog" with soot).

Certain embodiments include wired and/or wireless communications. In some cases, an aftertreatment system may receive an activation command from a remote device. A remote device may be associated with a user (e.g., a person testing a backup generator, a driver of an ambulance, and the like). A remote device may include an automated device (e.g., coupled to a GPS system) that notifies the aftertreatment system when the engine is within a certain distance of the system.

DETAILED DESCRIPTION OF THE INVENTION

Figure 1A:
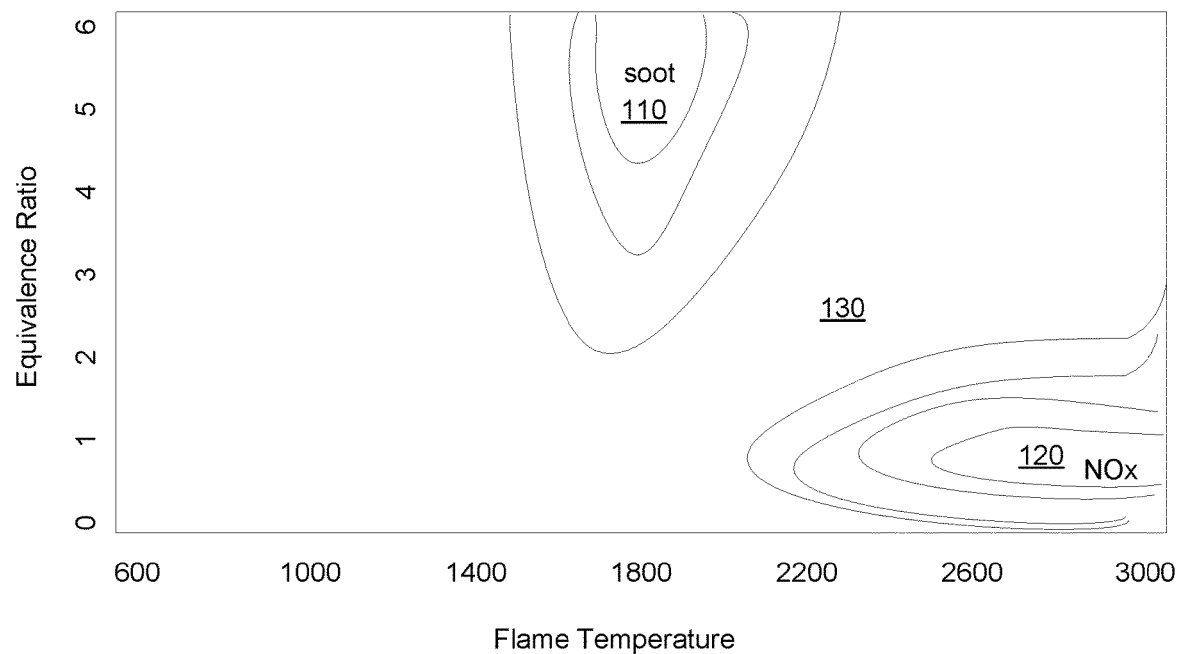
FIGS. 1A-C illustrates several exemplary representations of emissions relationships as a function of operating conditions (hereinafter: maps).

Various aspects provide for treating an emissions stream to reduce a concentration of one or more species. An overall and/or integrated impact of an emissions stream may be reduced by controlling and/or otherwise varying a temporal dependence of the ratio of certain species to other species.

A powertrain may include a device to convert chemical energy to work and/or heat (e.g. a direct injection engine, a spark induced ignition engine, a gasoline engine, a diesel engine, a natural gas engine, an ethanol engine, an HCCI engine, a stratified charge engine, a turbine, a stirling cycle engine, a boiler, a furnace, a fluidized bed combustor, a boxer engine, an opposed piston engine, an opposed piston opposed cylinder engine, a two cycle engine, a four cycle engine, an Otto cycle engine, an Atkinson cycle engine, and the like, hereinafter: engine). A hybrid powertrain may be dynamically controlled to reduce emissions. In some cases, dynamic control includes changing operating conditions of the engine to change a ratio of emitted pollutants (e.g., soot vs. NOx). A hybrid powertrain may include multiple fuel sources (e.g., a diesel engine may be coupled to a propane-fired heater).

In some embodiments, a hybrid powertrain includes an engine whose operating conditions may be changed in a manner that alters a ratio of emitted species. In some configurations, an engine may be operated in a "high soot" mode for a first period of time, and operated in a "high NOx mode" for a second period of time. In some cases, NOx (e.g., NO2) may be used to oxidize soot. In some cases, soot may be used to reduce at least one of N2O, NO, NO2, and the like.

A hybrid powertrain may include more than one motive force generator. In some cases, an engine may be hybridized with an electric motor, and power (to a load) may be provided by the engine and/or motor. A motor may receive power from a power cable (e.g., coupled to the electrical grid). A motor may be coupled to an energy storage device (e.g., a battery, a flywheel, and the like).

The engine may include an emissions aftertreatment device, and may exhaust heat and chemical species (e.g., soot (or particulate matter), NOx, hydrocarbons, CO, Ca)) through the aftertreatment device. The aftertreatment device may include a substrate, which may operate with or without a catalyst. In some cases, a catalyst may be injected (e.g., into the engine, into the aftertreatment system, or elsewhere). A catalyst may be disposed on the substrate (e.g., with a wash coat).

Various aspects may include sensors (e.g., pressure, temperature, flow, concentration of various chemical species, and the like). An aftertreatment device may include a heater (e.g., a glow plug), that may be electrical and/or fueled (e.g., with engine fuel, propane, grid power, a battery, and the like). The heater may include an ignitor (e.g., a piezoelectric spark ignitor). The heater may be disposed in a first region of the aftertreatment system such that the first region may warm up more quickly than a second region. The heater may be disposed in a first region that might otherwise warm up more slowly than a second region. In some cases, a heater may be associated with a region through which a larger percentage of an exhaust stream passes (e.g., a "high flow" region). In some cases, a heater may be associated with a "low flow" or even a relatively "stagnant" region.

A powertrain control unit may be coupled to various components and may receive demands for power, torque, heat, and the like (hereinafter: output). A demand may be received from a user (e.g., using an accelerator pedal). A demand may be received from one or more automated controllers. A demand may be received from a load coupled to the powertrain and/or powertrain control unit. A received demand for output may be used to calculate one or more operating conditions that could provide the demanded output. In some cases, calculation may include receiving signals from one or more sensors (e.g., engine speed, vehicle speed, time, and the like). Some embodiments may incorporate location in various calculations. For example, a powertrain incorporating a diesel engine and an electric motor may be at least partially controlled based on geographical location (e.g., using GPS coordinates and/or local networks). Such a powertrain may provide a larger amount of output from the electric motor when the powertrain is located near a hospital, nursing home, or school.

Calculation may include using a past operating history and/or a predicted future operation. One or more "recipes" for demand fulfillment may be calculated, and a recipe that minimizes one or more pollutants may be chosen. For example, a heavy truck accelerating away from a toll booth may be associated with a demand for maximum torque. A first operating condition that fulfills this demand may result in substantial soot or NOx emissions (e.g., in the vicinity of the toll booth). A second recipe for demand fulfillment may include the provision of torque from an onboard battery and electric motor. The second recipe may include reduced demand for torque from the engine, which may result in reduced soot emissions. Certain embodiments may provide for reduced emission of criteria pollutants, even though the emission of other species (e.g., CO2) might be increased.

Figure 1B:
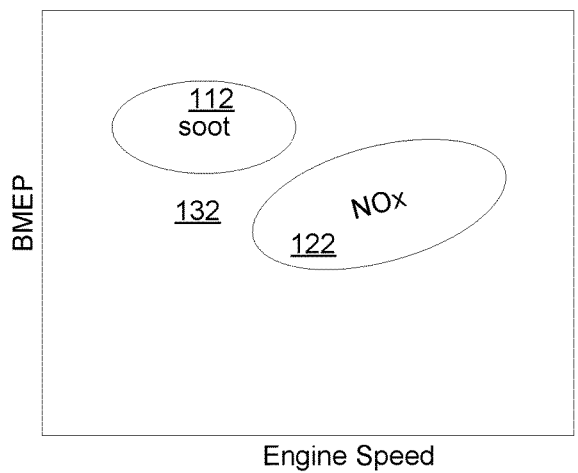
Figure 1C:
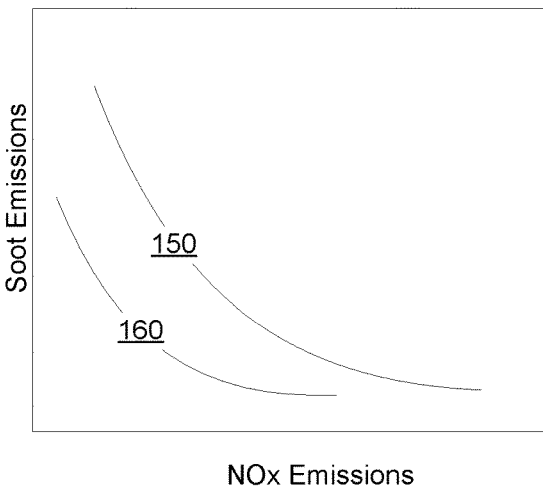

FIGS. 1A-C illustrates several exemplary representations of emissions relationships as a function of operating conditions (hereinafter: maps), FIGS. 1A-C schematically represent relationships involving two pollutants—soot and NOx—although similar maps may be generated with respect to CO, CO2, hydrocarbons, NH3, and/or other species.

FIG. 1A illustrates a schematic map of emissions concentration as a function of engine operating conditions. In this example, different operating conditions may result in a range of combinations of flame temperature and equivalence ratio. A first operating condition 110 may result in relatively high concentrations of soot in the emissions stream. A second operating condition 120 may result in relatively high concentrations of NOx in the emissions stream. A third operating condition 130 may result in relatively lower concentrations of soot and NOx.

FIG. 1B illustrates a schematic map of emissions concentration as a function of engine operating conditions. A first combination 112 of Brake Mean Effective Pressure (BMEP) and engine speed (and/or power) may result in increased soot emissions. A second combination 122 of BMEP and engine speed may result in increased NOx emissions. A third combination 132 may result in reduced emissions of soot and NOx. FIG. 1C illustrates an exemplary "emissions tradeoff" curve. A typical powertrain may be characterized by a first combination of emitted soot and NOx. In some cases, a first curve may describe a relative amount of emitted soot and/or NOx—creating a "tradeoff" in emissions reductions—at a given load, the engine either emits more soot or more NOx. A hybrid powertrain may be operated at a second condition 160 to result in the reduction of multiple pollutants (e.g., soot and NOx).

Knowledge of a map associated with an engine may be used to determine emissions as a function of different demands for output. In some cases, a demand for output may be received. A predicted emissions stream based on a first set of operating conditions may be calculated (e.g., a first position on an engine map). A combination of motive forces (e.g., electric motor and engine) may be determined that results in engine operating conditions (e.g., a second position on the engine map) that yields an improved emissions stream.

Some engines emit high quantities of pollutants under conditions near maximum output. Certain embodiments use a supplementary motive force (e.g. an electric motor) to provide a torque boost and/or power boost to an engine, such that peak emissions are reduced. For some applications, knowledge about (e.g., sensing of, history of, prediction of) a duty cycle may be used to reduce emissions.

Figure 2A:
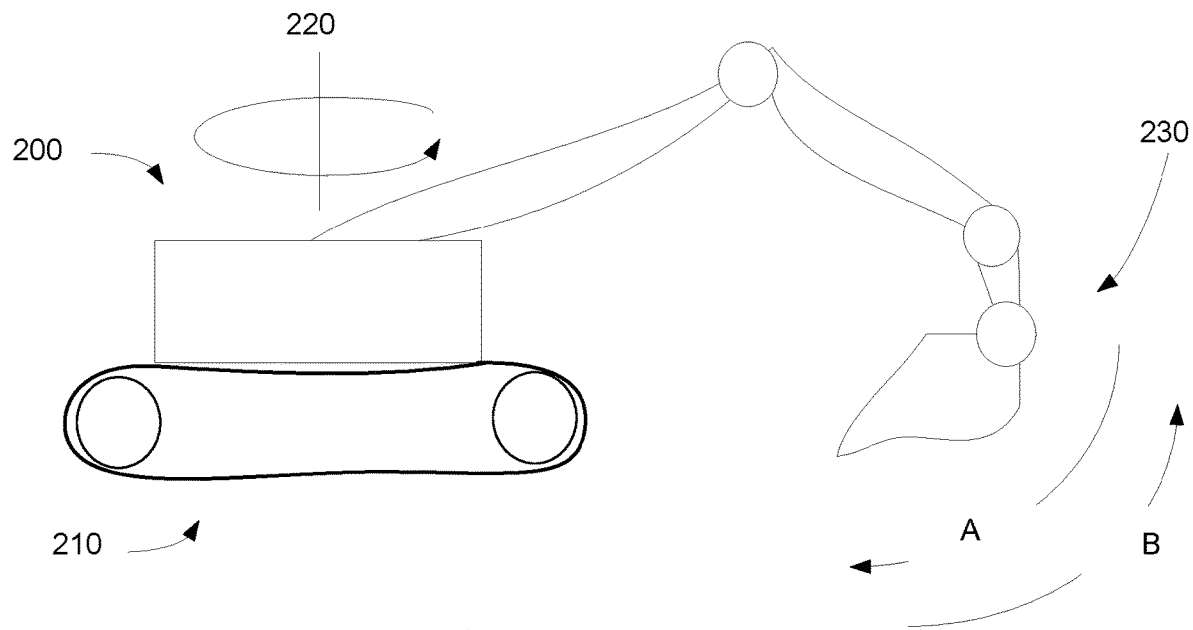
FIGS. 2A and 2B illustrate two exemplary illustrations of "duty cycle" characteristics.
Figure 2B:
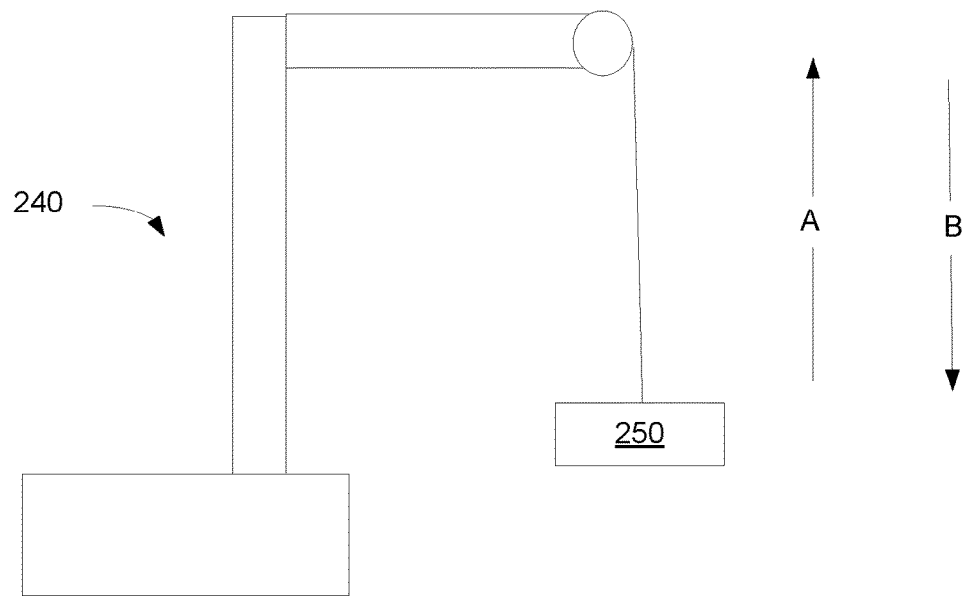

FIGS. 2A and 2B illustrate two exemplary illustrations of "duty cycle" characteristics. FIG. 2A illustrates a backhoe 200, which may include an engine (e.g., a diesel engine, not shown) to fulfill load demands. Load demands may include operating tracks 210 to move the backhoe, rotating the shovel/cabin structure (e.g., about axis 220), operation of shovel 230, HVAC (e.g., inside the cabin) and the like. Loads may operate over different time scales with different output requirements. For example, tracks 210 may be operated relatively infrequently as compared to shovel 230. FIG. 2B illustrates a schematic of a crane 240, which may include an engine (and may include more than one engine). Crane 240 may lift an object 250 (e.g., steel girders, a shipping container, and the like). In some cases, the functional nature of a device incorporating a powertrain provides information regarding the duty cycle—a backhoe is typically used to dig holes, a crane typically lifts objects, a bulldozer typically pushes earth.

Certain demands for load may be characterized by a characteristic dependency of load vs. time (e.g., a periodicity, a time between tests, and the like). For example, backhoe 250 may scoop earth with shovel 230 during a "high load" period "A" and return to a position to take another scoop during a "low load" period "B." Crane 240 may lift object 250 from the ground during a "high load" period A and return (e.g., to the ground) during a "low load" period B. Certain embodiments may provide for reducing total emissions by increasing engine output during "low load" conditions (e.g., charging a battery) such that a reduced engine output is necessary during "high load" conditions. In some embodiments, a battery, capacitor, flywheel, and/or other storage device may be "charged" during low load conditions (marginally increasing relative engine demand) and discharged during "high load" conditions (providing for reduced emissions). In some applications using standard powertrains, short periods of time may result in relatively large pollutant emissions. A hybrid powertrain may provide for a "peak shaving" effect with respect to emissions by "smoothing" the output demands on the engine.

Figure 3A:
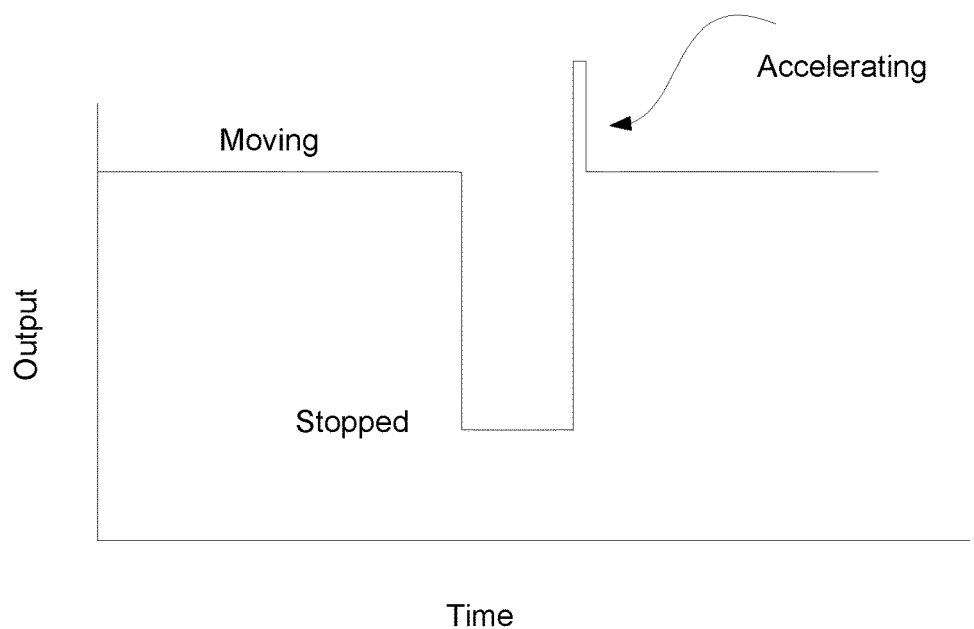
FIGS. 3A and 3B illustrate exemplary demands for output that may result in an increase in emissions.
Figure 3B:
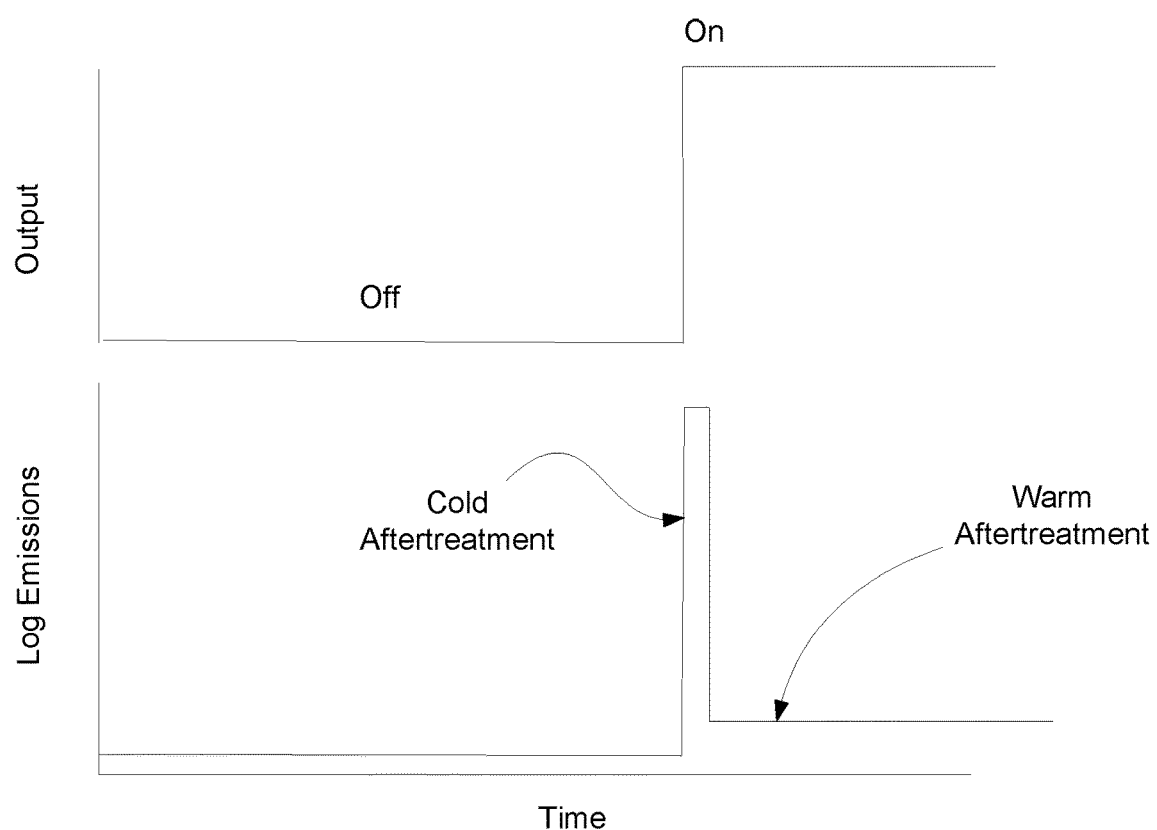

FIGS. 3A and 3B illustrate exemplary demands for output that may result in an increase in emissions. FIG. 3A schematically illustrates a hypothetical plot of demand vs. time that may be representative of a transit vehicle. During motion (e.g., carrying passengers), output may be relatively high. Stopped (e.g., at a bus station), the engine may be idling. Highest output may be required during acceleration (e.g., away from a train station). In some cases, high demand (which might be associated with high emissions from a standard powertrain) may occur close to large concentrations of people (e.g., people waiting at a bus stop). For some pollutants (e.g., soot), there may be a strong dependency on toxicity of exposure vs. concentration. As a result, emitting pollutants within a few feet of a person may be much more dangerous than emitting those pollutants tens of yard or hundreds of yards away. Certain embodiments provide for reducing a short-term "spike" in emissions by using a hybrid powertrain that calculates a recipe that meets a demand at reduced emissions.

FIG. 3B illustrates an exemplary schematic "cold start" spike associated with emissions. In typical systems (e.g., a car with a catalytic converter, a backup generator, and the like), an emissions aftertreatment system may not fully function until exhaust heat has "warmed up" the aftertreatment device. In some cases, short-time-scale emissions (during warmup) may be significantly larger than "steady state" emissions associated with a normally functioning device.

An exemplary hybrid powertrain may include a diesel, natural gas, syngas, and/or gasoline engine, and may include an electric motor (optionally with an energy storage device such as a capacitor, battery, flow battery, and the like). A backup generator may have a duty cycle comprising extended periods of time with no demand for load, interspersed with periods of high demand for load. Some times of high demand may be predicted (e.g., a testing procedure for the backup generator). Some times of high demand may not be predicted (e.g., a power outage). In some cases, grid power may be used to reduce emissions from a hybrid powertrain having an engine and motor (e.g., during testing). In some cases, an energy storage device may provide power that enables the engine to reduce emissions (e.g., a battery or propane tank may begin heating an aftertreatment device upon being triggered by a power outage).

In some applications, a priori knowledge of an incipient demand may be used to precondition (e.g., preheat) an emissions aftertreatment system (e.g., to prepare for a testing protocol). In some embodiments, a wireless signal (e.g., from a cellular, 802.*, bluetooth, or similarly enabled device) may trigger activation of an emissions aftertreatment system. In some cases, activation may include preheating, that may include using electrical power. Grid power and/or a coupled energy storage device may provide energy for preconditioning, preheating, and the like. In some cases, (e.g., an emergency backup), a coupled energy storage device may be used to quickly heat an emissions aftertreatment system to improve catalytic activity, particulate matter filter lightoff, and the like. In some cases, knowledge of an historical duty cycle (e.g., number of times a system has been operated without lightoff) may be used to calculate a control protocol for an emissions aftertreatment system.

A hybrid powertrain may incorporate an electrochemical cell and an engine. The electrochemical cell may provide power while the engine and/or aftertreatment system associated with the engine heats up. The electrochemical cell may be used to heat the exhaust stream and/or aftertreatment system (e.g., such that the aftertreatment system reaches an operation temperature sooner than if heated only using exhaust gases).

Figure 4:
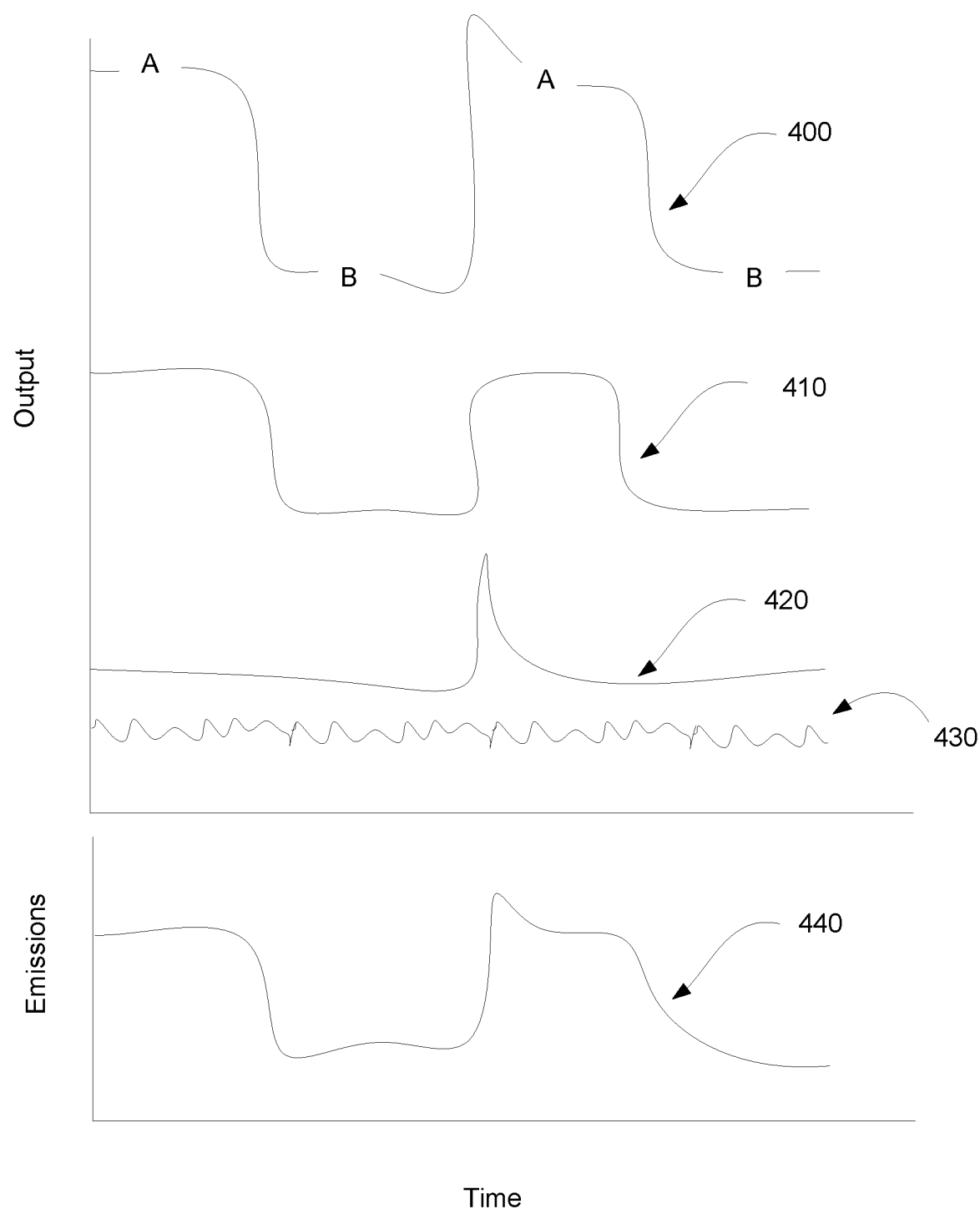
FIG. 4 illustrates an exemplary deconvolution of demand, according to some embodiments.

FIG. 4 illustrates an exemplary deconvolution of demand, according to some embodiments. Integrated demand 400 may characterize a temporal dependence of the output demanded of a powertrain. Integrated demand 400 may include periods of relatively higher output (A) and lower output (B). Integrated demand 400 may be deconvoluted into a plurality of demand components (in this example, demand components 410, 420, and 430). Deconvolution may include transforming integrated demand 400 (e.g., using Fourier and/or Laplace transforms). Deconvolution may include monitoring sensors associated with various loads and associating these sensors with changes in integrated demand 400. Deconvolution may include using maps associated with the powertrain. Emissions as a function of demand may be measured, calculated, and/or predicted. Exemplary emissions response 440 may correspond to emissions emitted by a powertrain fulfilling integrated demand 400 under first operating conditions. Emissions response 440 may be associated with one or more emitted species, and may be deconvoluted temporally (as with integrated demand 400) and/or chemically (with respect to emitted species).

In some embodiments, one or more demand components is associated with at least a portion of emissions response 440. For example, demand component 420 may be associated with a short term "spike" in emissions. A hybrid powertrain may include hardware (e.g., a battery and motor) sized according to the requirements of demand component 420 (e.g., torque, power, energy, periodicity, and the like), and so may be operated to preferentially provide power in a manner that reduces overall emissions while meeting integrated demand 400.

Deconvolution of integrated demand and/or emissions may include the incorporation of duty-cycle information. Certain powertrains are used in applications characterized by duty cycles having some repeatability, predictability and/or periodicity. Knowledge about historical duty cycles and/or prediction of future duty cycles may be used to reduce emissions and/or improve the performance of emissions control systems. In some cases, an application toward which a powertrain is directed may be used to determine duty cycle information. User input may be received (e.g., a projected use time). In some cases, duty cycle information may be uploaded and/or downloaded (e.g., wirelessly). Duty cycle information may be calculated (e.g., by summing or integrating historical or predicted use data). Duty cycle information may include location information. For example, a tractor may be used to plow a field, and GPS information associated with the location of the tractor may be used to determine a percentage of the field yet to be plowed, and by extension, an estimate of time to completion under a given set of load conditions. An estimate of time to completion may be used to determine (for example) whether or not to regenerate a soot filter, NOx trap, and the like. Duty cycle information may include fuel information (e.g., a percentage of FAME in biodiesel, a percentage of ethanol in gasoline, a cetane, a sulfur level, a viscosity, and the like). Duty cycle information may include environmental information (e.g., temperature, weather, altitude). Duty cycle information may include an estimated time in port (e.g., for a ship), availability of hotel power, time at a truck stop, time until reaching a rest area, time until end of shift, and the like.

Some hybrid powertrains may have a finite amount of available energy (e.g., from a battery) with which to minimize environmental impact. For example, a mobile application may include an engine having 100 kW output and a battery capable of storing 1 kW (with adequate lifetime). Using the available energy in the battery to reduce $CO_2$ emissions from the engine may provide less benefit than using energy in the battery to reduce the emission of soot, NOx, hydrocarbons, and the like. A few hundred watt-hours of energy might improve emissions more if directed toward heating a (cold) aftertreatment system.

In some cases, a plurality of responses may characterize a duty cycle. For example, a diesel backhoe may have one response or mode characterizing steady-state operation of the engine (e.g., low torque loads) and another mode characterizing major torque requirements.

Some aspects provide for using knowledge of duty cycles (e.g., torque requirements and/or time dependence of load (s)) to reduce emissions. In some cases, an engine, motor, and storage device are coupled, and a duty cycle prediction and/or history may be used to determine a combination of engine, motor and energy source applied to a load. Certain aspects include using an energy storage device and/or other (non-combustion) energy source to provide at least a portion of demanded torque, which may allow operation of the engine in a less-polluting regime than might have been required without hybridization of the response to load.

Figure 5:
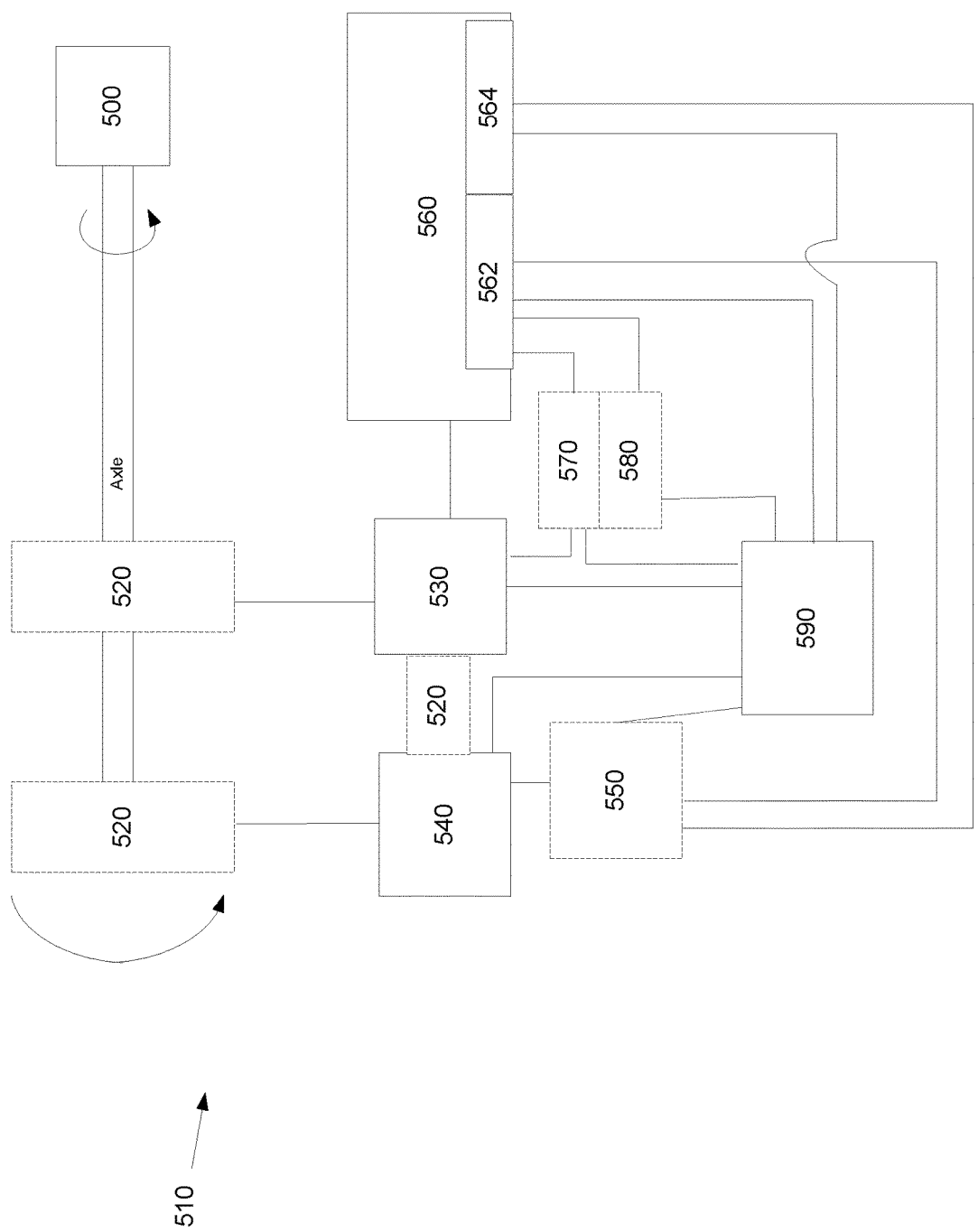
FIG. 5 illustrates various aspects of a hybrid powertrain, according to certain embodiments.

FIG. 5 illustrates various aspects of a hybrid powertrain, according to certain embodiments. A load 500 may require output from hybrid powertrain 510. A demand for output may be transmitted to the hybrid powertrain using a mechanical, electrical, optical, wireless, acoustic, and/or other signal mechanism (not shown). Hybrid powertrain 510 may include an engine 530, which may optionally include control mechanisms configured to change the composition of an emitted exhaust stream. Exemplary mechanisms include control of injection timing, injection duration, number of injections, fuel/air ratios, ignition timing, exhaust gas recirculation amount, boost, and the like. Certain embodiments may include an electric motor 540 (and/or generator, alternator, and the like). Some embodiments may not include a motor. Various components of hybrid powertrain 510 may be coupled to load 500 via one or more clutches 520. In some embodiments, engine 530 is coupled to load 500. In some embodiments, motor 540 is coupled to load 500. Engine 530 and motor 540 may optionally be coupled together (e.g., with a clutch 520). In some embodiments (e.g., a serial configuration), one of engine 530 and motor 540 is coupled to load 500. In some embodiments (e.g., a parallel configuration) both engine 530 and motor 540 are coupled to load 500.

Motor 540 may receive power from a power line (e.g., grid power, a photovoltaic cell, and the like). Motor 540 may receive power from an energy storage device 550 (e.g., an electrochemical cell, flow battery, fuel cell, capacitor, ultracapacitor, Li-ion battery, and the like). In some embodiments, energy storage device 550 includes a mechanism for mechanically and/or chemically storing energy (e.g., a flywheel, a compressed gas canister, and the like), which may be mechanically coupled to motor 540 and/or engine 530 (e.g., with a clutch, valve, thermoelectric module, and/or other device to convey energy to/from the storage device). In some cases, energy storage device 550 may be coupled to a generator (not shown) which may be coupled to motor 540. Motor 540 may serve as a coupling between energy storage device 550 and other components.

Engine 530 may be in fluid communication with an exhaust aftertreatment system 560. Aftertreatment system 560 may receive exhaust gas from engine 530 and treat the exhaust gas (e.g., in a manner that reduces the environmental impact of the exhaust gas). Aftertreatment system 560 may include a catalytic converter (e.g., with a 2-way catalyst, 3-way catalyst, and the like). Aftertreatment system 560 may include a diesel oxidation catalyst (DOC), a soot filter, a system to remove NOx, and the like. A system to remove NOx may include a lean NOx trap. A system to remove NOx may include a selective catalytic reduction (SCR) system. Aftertreatment system 560 may include components as described in U.S. patent application Ser. No. 12/183,917, filed Jul. 31, 2008, and Ser. No. 12/756,987, filed Apr. 8, 2010, the disclosures of which are incorporated by reference herein.

Some implementations may include an injector or other mechanism to inject species into an aftertreatment system. Fuel, urea, syngas, NH3, air, oxygen, AdBlue™, ethanol, esters, and/or other species may be injected. Some species may be stored (e.g., in an energy storage device). Certain embodiments include apparatus for performing SCR reactions (e.g., within the aftertreatment system). Some species may be converted into another species prior to injection. In the embodiment shown in FIG. 5, a reformer 564 may convert a stored fuel (e.g., diesel fuel, propane) to a species (e.g., syngas) and inject the species into aftertreatment system 560. Devices (e.g., reformer 564) may be in communication with and/or controlled by various other components (e.g., PCU 590).

Some implementations may include a heater 562. Heater 562 may be configured to heat exhaust gas (e.g., directly), heat a component (e.g., a tube carrying exhaust), heat a substrate (e.g., a substrate treating the exhaust), heat a container (e.g., a can containing a substrate) and the like. Heater 562 may be configured to heat aftertreatment system 560. Heater 562 may include an electrical heater (e.g., a heating element) which may be coupled to other components (e.g., energy storage device 550). Certain embodiments of hybrid powertrain 510 may include chemical storage of fuel (e.g., diesel fuel, urea, ammonia, methane, ethane, propane, butane, pentane, LPG, hydrogen, butanol, ethanol, methanol, propanol, esters, aldehydes, and the like). In some cases, heater 562 may be coupled to the chemical storage, which provides heating energy. In some embodiments, a propane tank delivers propane to heater 562. Heater 562 may include an ignitor (e.g., a spark plug) which may be coupled to various other electrical and/or energy storage components. In some embodiments, energy storage device 550 includes a battery, and heater 562 includes a resistive heating element.

Some embodiments of hybrid powertrain 510 may include a turbocharger 570. Some embodiments may include an exhaust gas recirculation system (EGR) 580. Turbocharger 570 and/or EGR 580 may be in fluidic communication with engine 530 (e.g., with the exhaust gas from engine 530) and may be electrically and/or mechanically coupled to other components (e.g., controlled by another component).

Various components of hybrid powertrain 510 may be controlled by powertrain control unit (PCU) 590. PCU 590 may be in communication with one or more components described herein, and may include wired and/or wireless communication circuitry. PCU 590 may transmit and/or receive signals associated with load 500, clutch(es) 520, motor 540, engine 530, energy storage device 550, aftertreatment 560, heater 562, turbocharger 570, EGR 580, and/or other components. PCU 590 may be configured to receive input from an operator (e.g., a driver of a vehicle) and/or an automated or computer-controlled device. PCU 590 maybe configured to transmit and/or receive cellular signals, 802.* signals, bluetooth signals, GPS signals, and/or other signals.

Figure 6:
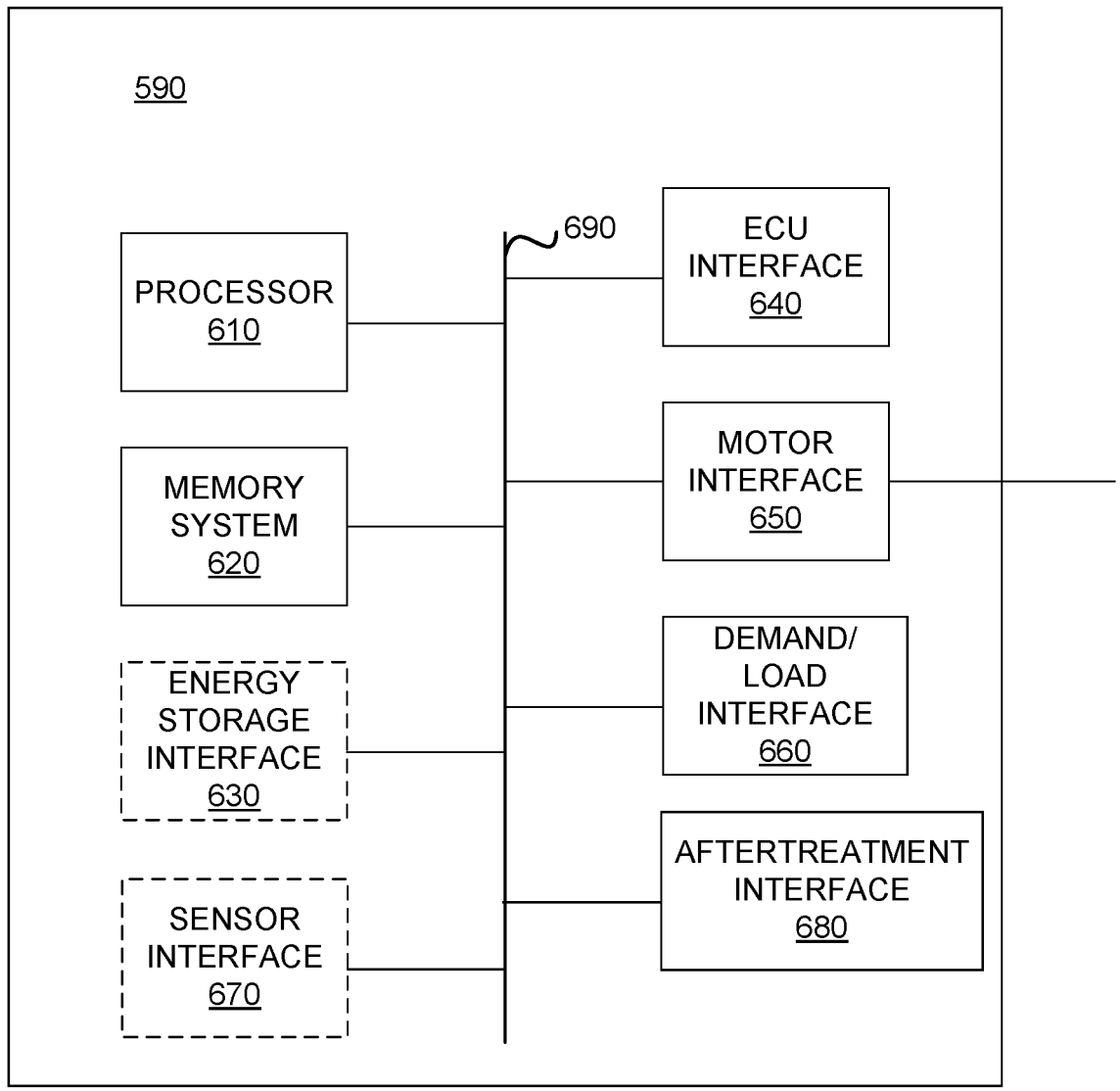
FIG. 6 illustrates several components of a control device, according to some embodiments.

FIG. 6 illustrates several components of a powertrain control unit, according to some embodiments. A processor 610 may be configured to execute instructions stored on a computer-readable storage medium, such as memory system 620 (e.g., hard drive, flash memory, RAM and the like). An energy storage interface 630 (and/or line power interface) may interface with an energy storage device and/or meter associated with the power line. An engine control unit interface 640 may interface with an engine control unit (e.g., associated with engine 530). A motor interface 650 may interface with a motor (e.g., motor 540). A load interface 660 may interface with a load and/or a sensor associated with a requested or demanded output. Sensors may include position sensors (e.g., of an accelerator position), torque sensors, piezoelectric sensors, optical sensors, magnetic sensors, thermocouples, flow sensors, pressure sensors, acoustic sensors, engine timing sensors, rotation sensors, and the like). Load interface 660 may be in wired, wireless, and/or other communication with load 500. Sensor interface 670 may interface with one or more sensors. A sensor may sense a characteristic of an engine, a motor, an energy storage device, temperature, mass flow, an aftertreatment device, an emissions stream (e.g., upstream and/or downstream of an aftertreatment device), pressure, soot loading, NOx, CO, hydrocarbons, NH3, torque, power, and the like. In some embodiments, an aftertreatment interface 680 may interface to an aftertreatment device (e.g., aftertreatment device 560 and/or heater 562). Various components may be coupled (e.g., via bus 690). PCU 590 may include and/or be coupled to wired and/or wireless communications circuitry.

Figure 7:
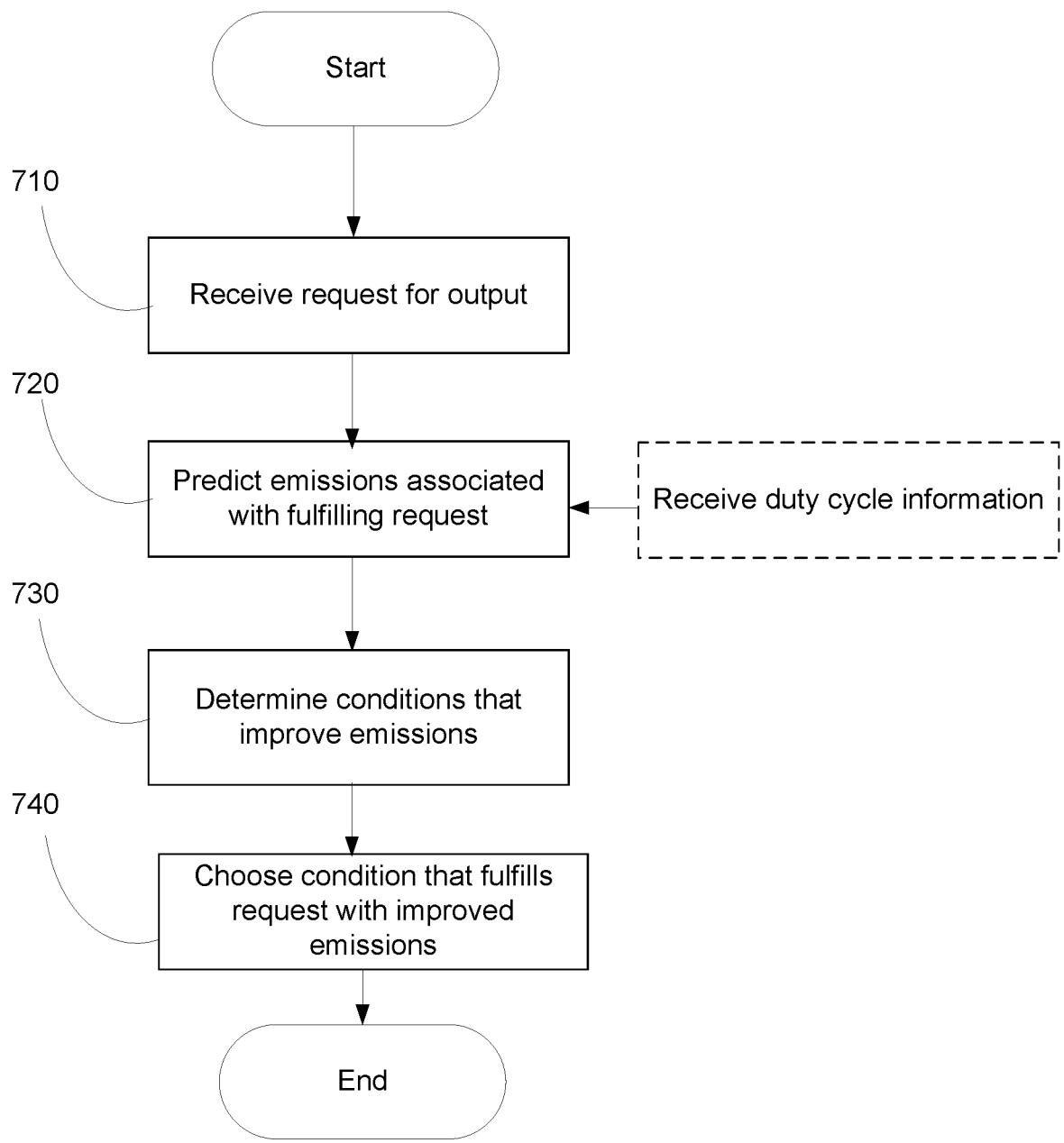
FIG. 7 illustrates a method, according to some embodiments.

FIG. 7 illustrates a method, according to some embodiments. In step 710, a demand or request for output is received (e.g., at PCU 590). In step 720, a predicted emissions profile associated with fulfilling the request under a first operating condition (e.g., a "standard" and/or "suboptimal" operating condition) is calculated. In some cases, duty cycle information associated with the powertrain may be received, and may be used in various calculations. In step 730, one or more second conditions is determined (e.g., calculated using a minimization algorithm). A second condition may include a set of operating conditions that fulfills the request and is predicted to result in reduced emissions as compared to the first condition.

A second condition may include adjusting a heater temperature associated with an aftertreatment device. A second condition may include a combination of motive forces (e.g., engine and motor) that is different than that of the first condition. A second condition may include an adjustment in engine controls (e.g., injection timing) as compared to the first condition. A second condition may include injecting a fuel and/or reductant into an aftertreatment device. For a given set of operating parameters that describes an operating condition of a hybrid powertrain, a first condition may be a first set of values for the parameters and the second condition may be a set of values, for which at least one parameter has a different value. In some embodiments, a first set of values is received, an emissions profile according to the first set is calculated, a first value is modified to become a second value, and a second emissions profile according to the second set is calculated. Values may be modified randomly (e.g., changed by a few percent about the previous value). An emissions profile may be minimized using a minimization algorithm (e.g., least squares, Monte-Carlo, and the like) in which permuted values that result. In reduced emissions are preferentially selected, subject to operational constraints (e.g., fulfilling the demand).

In step 740, a second condition that fulfills the request at reduced emissions is chosen. The chosen condition may result from the minimization algorithm (e.g., be one of the minima in emissions that fulfills the demand). In some aspects, the first condition includes output provided by an engine, and the second condition includes output provided by an engine and a motor. In some embodiments, the request is associated with a demand for high (or maximum) torque, and the second condition provides for the demanded torque using the motor and/or a combination of engine and motor. In some cases, torque may be provided exclusively by the motor for a period of time that may be associated with capacity of an energy storage device coupled to the motor. For example, the first few seconds (e.g., first five seconds, three seconds, two seconds, one second or even 0.5 seconds) of high torque may be provided by a motor connected to an ultracapacitor, which may allow the engine to operate in a condition that results in reduced emissions as compared to the engine providing the requested torque for those few seconds.

In an exemplary embodiment, a hybrid powertrain may include an engine and a battery, and may be configured for a "backup power" duty cycle. A demand for output may result in an operating condition that initially and/or preferentially uses power from the battery, rather than the (cold) engine. In some cases, the demand may trigger a heating of an aftertreatment device associated with the engine. The battery may provide power (e.g., to a heater associated with the aftertreatment device). The engine may be activated at or near a point at which the aftertreatment device is expected to perform (e.g., when the aftertreatment device reaches or approaches a temperature at which emissions are reduced). The engine may recharge the battery.

Certain combinations of powertrain and demand for output may be associated with "predetermined" optimized operating conditions. In such cases, a hybrid powertrain may implement a predetermined operating condition without an optimization step.

Figure 8:
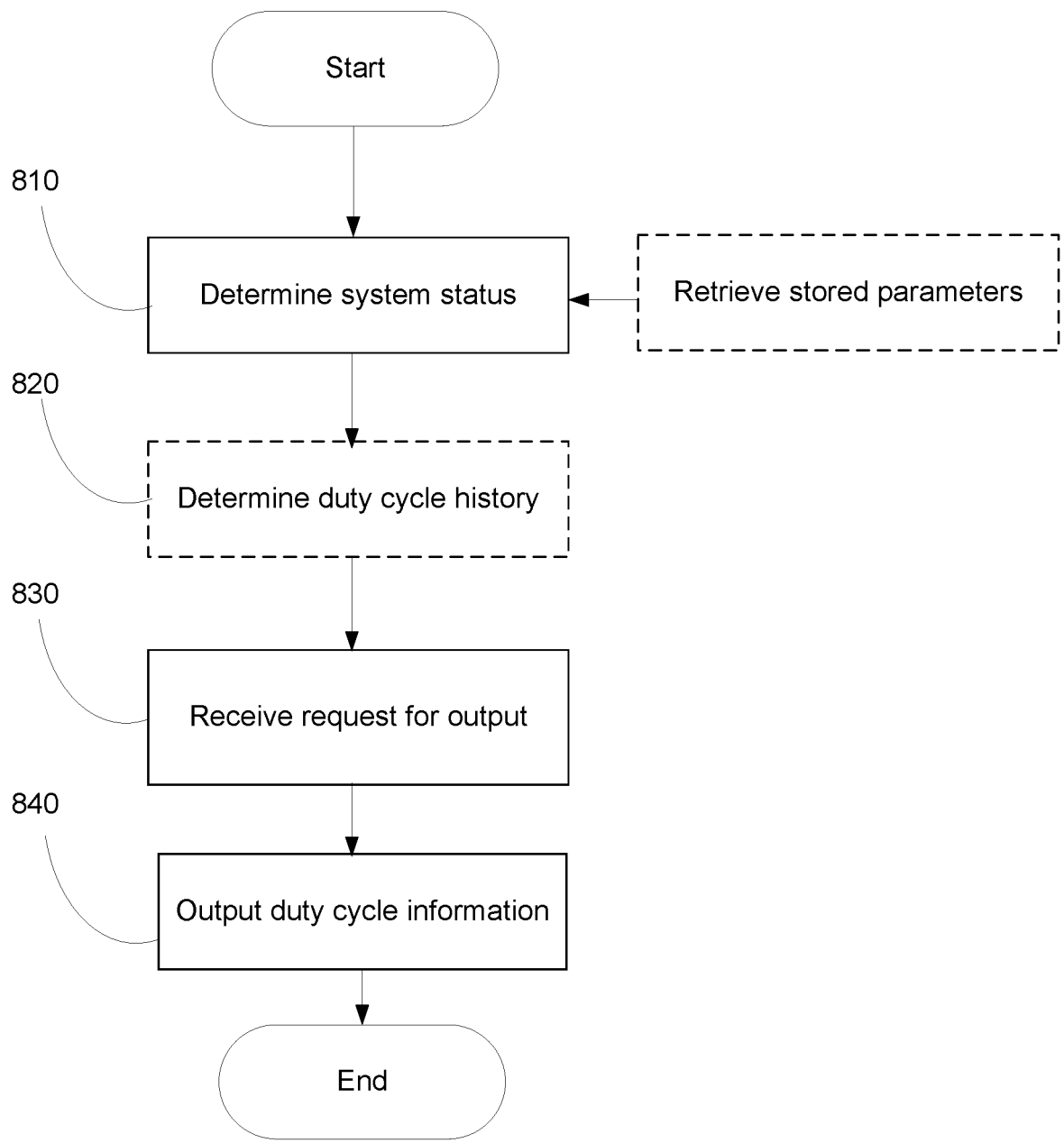
FIG. 8 illustrates a method, according to some embodiments.

FIG. 8 illustrates a method, according to some embodiments. In some implementations, characteristic features of a duty cycle associated with a powertrain may be used to minimize the impact of emissions from the powertrain. Characteristic features may include a type of equipment into which the powertrain is installed (e.g., a water pump, a garbage truck, a passenger vehicle, and the like). A duty cycle may include a demand for output, and in some cases may include a temporal dependence of a demand for output. For example, a suburban letter carrier may drive a vehicle that repeatedly accelerates away from a mailbox, travels to the next mailbox, decelerates to the next mailbox, stops to deliver and retrieve mail, then repeats. A hybrid powertrain may use this information to minimize emissions over the duty cycle. Minimization may also include location information. For example, a truck operating near a port or intermodal yard may be operated differently than a truck operating in the countryside. A vehicle being driven at rush hour may be operated differently than a vehicle driven at night. In some cases, the relative importance of certain pollutants vs. other pollutants changes as a function of time, place, and other aspects. $CO_2$ emissions may be more important in some cases. CO, soot, NOx, and the like may be more important in other cases. A hybrid powertrain may be operated to minimize one or more pollutants, and may be adjusted to change the relative ratio of emitted pollutants according to various input factors.

In step 810 a system status is determined. System status may include characteristics of the powertrain, equipment driven by the powertrain, and input from sensors. Sensors may sense ambient parameters (e.g., temperature, humidity), powertrain parameters (temperature, pressure, flow rate, output, and the like), load parameters (e.g., demand for output), and other parameters. In some embodiments, determining system status includes retrieving stored values for one or more parameters.

Duty cycle history may be determined in optional step 820. In some implementations, performance of a powertrain (e.g., emissions levels) may be affected by prior operation (e.g., a soot filter may become "clogged"). The duty cycle history may be associated with the past few seconds, few minutes, few hours, few days, few weeks, few months, few years, or even longer times of operation. Duty cycle history may include cumulative information regarding various components (e.g., soot accumulation in a particulate filter, reductant usage in an SCR system, time spent at temperature for an aftertreatment system, and the like). In some embodiments, a history of duty cycles (e.g., the past few seconds, few minutes, few hours, few days, few weeks, few months, or even longer) may be used to determine an optimal future operating condition. An estimated soot loading in a particulate filter may be determined (e.g., via duty cycle history, pressure differential measurements before and after, and the like). In some aspects, determining the operating condition may include determining a time at which certain catalytic activity (e.g., NOx reduction, NOx trapping, soot lightoff, and the like) are expected, and may include minimizing a time needed to reach exhaust mitigation efficacy.

A request for output may be received in step 830. The request for output may be used to calculate an expected duty cycle that fulfills the request. Duty cycle information associated with the calculated duty cycle may be stored.

In step 840, duty cycle information associated with the duty cycle may be output. The duty cycle information may be associated with predicted operating conditions over the next few milliseconds, few seconds, few minutes, few hours, or even longer times of operation. Duty cycle information may be associated with an application of the engine (e.g., bulldozer vs. combine harvester vs. tug boat vs. locomotive vs. backup generator) a day's work, a month's work, or even a year's work.

Duty cycle information may include a set of operating conditions for the powertrain, and may provide instructions for controlling an engine, a motor, an energy storage device, an aftertreatement device, and/or other components. An operating condition may include a regeneration protocol associated with an aftertreatment device. In some cases, a predicted exhaust gas temperature profile (e.g., temperature vs. time) may be used to determine a regeneration protocol for an aftertreatment device.

Figure 9:
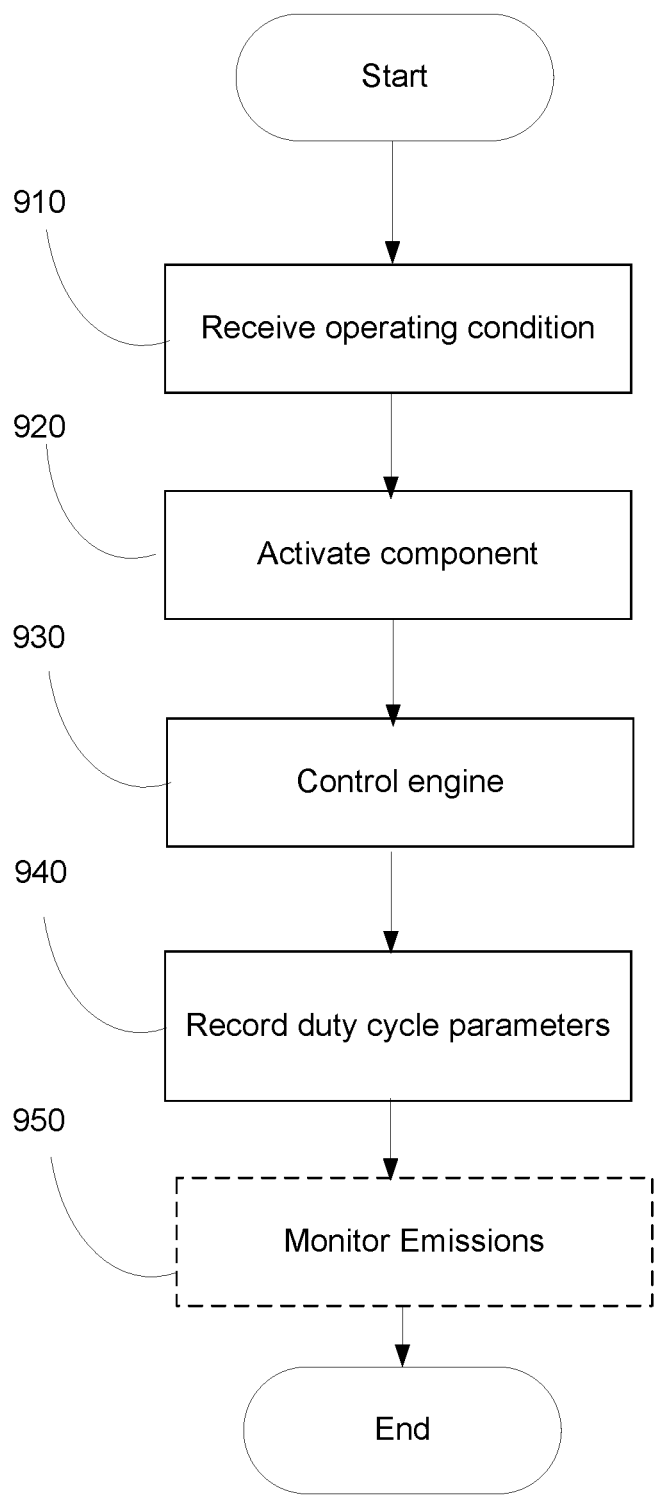
FIG. 9 illustrates a method, according to some embodiments.

FIG. 9 illustrates a method, according to some embodiments. In step 910, an operating condition (e.g., a set of parameters associated with meeting a demand for output) is received. An operating condition may include a second operating condition that results in reduced emissions as compared to a first or other operating condition. In step 920, a component may be activated. A component may include a motor, an aftertreatment device, a heater, a cooling system, an EGR system, a turbocharger, a valve, an injector, a vane (e.g., disposed in an exhaust stream and/or intake stream) and the like.

In step 930, the engine may be controlled in a manner that reduces emissions. Component activation and engine control may take place sequentially (e.g., component first, then engine, or engine first, then component). Component activation and engine control may take place substantially simultaneously (e.g., injection timing may be modified in a direct injection engine).

Duty cycle parameters (e.g., measures of an actual operating condition) may be recorded in step 940. In some cases, recorded parameters may be stored (e.g., integrated into a duty cycle history). In optional step 950, one or more emissions may be monitored. Certain implementations may include "closed loop" control of emissions. In such cases, parameters describing the monitored emissions may be incorporated into the calculation of operating conditions (e.g., incorporated into a duty cycle history).

Figure 10:
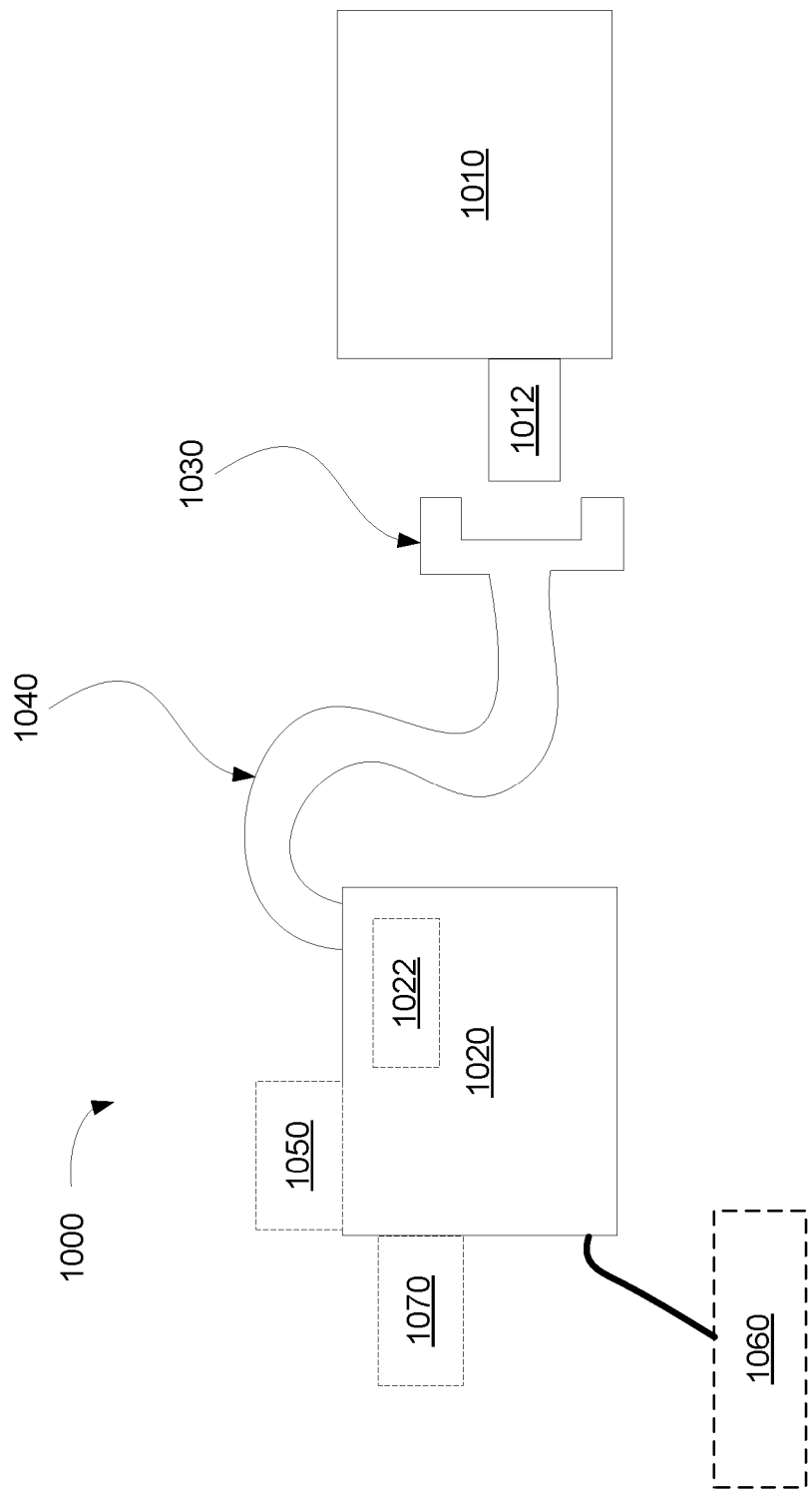
FIG. 10 illustrates an exemplary system, according to some embodiments.

FIG. 10 illustrates an exemplary system, according to some embodiments. Certain locations are characterized by the periodic arrival of equipment having relatively high levels of emissions. For example, an ambulance may park at an entrance to a hospital and allow the engine to run while unloading a passenger or waiting to load a passenger. A fire station may have fire engines that idle for extended periods of time outside the station. A docked ship or boat may emit exhaust at the dock. A bus or train may sit with its engines idling. A tank or truck may operate at a service center. In some cases (e.g., where engines repeatedly arrive at the same location), a remote exhaust mitigation device may be disposed at the location, and an attachable/removable hose or conduit may be removably coupled to the (exhaust emitting) tailpipe of the engine and used to convey exhaust gases to the remote mitigation device.

Remote aftertreatment system 1000 may be disposed in a location (e.g., a hospital) associated with a powertrain 1010 (e.g., an ambulance) that emits exhaust. Exhaust may be emitted via tailpipe 1012. Emissions from powertrain 1010 may be mitigated with an aftertreatment device 1020, which maybe removably coupled (e.g., fluidically, electrically, mechanically, and the like) to powertrain 1010. In some cases, an attachable/removable fitting 1030 may couple to (or be disposed near) tailpipe 1012, and may carry exhaust gases from powertrain 1010 to aftertreatment device 1020 via hose 1040.

In some embodiments, aftertreatment device 1020 may include a fan 1050 and/or other means (e.g., a pump, bellows, and the like) to "pull" gases from tailpipe 1012 through hose 1040. In some cases, mechanical attachment of fitting 1030 to tailpipe 1012 may not be necessary (e.g., fitting 1030 may behave as a "hood"). In some cases, fitting 1030 may sealingly attach to tailpipe 1012. In an exemplary embodiment, fitting 1030 may include an adjustable aperture (e.g., a plurality of extendable "leaves" as with a camera aperture) that may adjust to a range of radii associated with tailpipe 1012.

Aftertreatment device 1020 may include a system to mitigate one or more pollutants. In some embodiments, an aftertreatment device may include a DOC system, a soot filter, a de-NOx system, a catalytic converter, and the like. An aftertreatment device may include a scrubber, an absorbing material, an adsorbing material, and the like. Certain aftertreatment devices may include fly ash. An aftertreatment device may include a catalyst (e.g., disposed on a substrate). An aftertreatment device may include a system 1070 to inject catalyst into the aftertreatment device (e.g., into an exhaust gas stream). A substrate may comprise more than 10%, 30%, 70% or even 90% ash.

Aftertreatment device 1020 may include a cooling system (e.g., a water spray). Aftertreatment device 1020 may include a heater 1022, which may be configured to heat the exhaust gas and/or material contacting the exhaust gas. A heater may include a heating element (e.g., a glow plug), a catalytic combustor, a burner, and the like. Aftertreatment device 1020 may be coupled to an energy source 1060. Energy source 1060 may include an energy storage device (e.g., a battery, a fuel tank, and the like). Energy source 1060 may include an electrical power line, a natural gas line, and the like. Energy source 1060 may provide energy to (inter alia) heater 1022. In some embodiments, heater 1022 includes a burner (e.g., with an ignitor), and energy source 1060 includes a propane tank. In some embodiments, energy source 1060 includes a power line providing electrical power, and heater 1022 includes a heating element. Certain embodiments include a reformer coupled to a fuel source and configured to inject reformate into the system. Certain embodiments may be configured to inject an oxidizing species (e.g., oxygen, hydrogen peroxide, NO2, and the like) into the system. Some systems may be configured to inject a catalytic species (e.g., a liquid-carried catalyst) into the system.

In some cases, attachment of an emitting engine to an aftertreatment device (or turning on an attached engine) may trigger an operation of the device (e.g., preheating the device, activating "suction" and the like). In some cases, a flow rate (e.g., through the hose) may trigger activation of the aftertreatment device. In some embodiments, a first wireless signal is received (e.g., from an arriving ambulance). The wireless signal may trigger a heater associated with the aftertreatment device. A second wireless signal may trigger activation of suction. In some embodiments, aftertreatment device 1020 may be disposed in an overhead "bay" beneath which powertrain 1010 sits. In some cases, hose 1040 may be disposed with a "boom" that provides for bringing fitting 1030 close to (and/or in contact with) tailpipe 1012. In some embodiments, energy source 1060 may include a solar cell.

Figure 11:
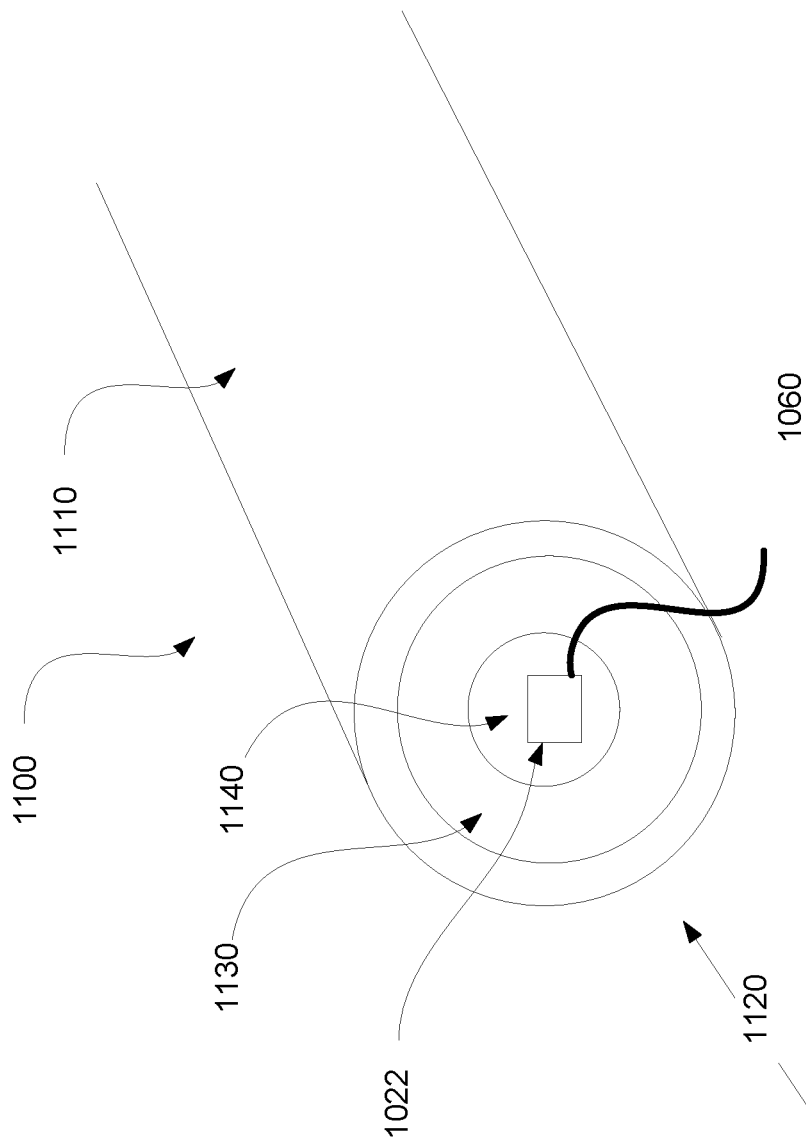
FIG. 11 illustrates an exemplary system, according to some embodiments.

FIG. 11 illustrates an exemplary system, according to some embodiments. In some embodiments, an aftertreatment device may include a heater, which may be activated remotely. For example, an aftertreatment device may include a particulate filter such as a wall flow filter, a three way catalytic converter, a lean NOx trap, an SCR device, a close coupled catalytic converter, a diesel oxidation catalytic converter, and the like. In some embodiments, a permeability (e.g., of exhaust gas) through the device may vary as a function of cross sectional area. In some cases, a first portion of the cross section of the device may have a different (e.g., higher) permeability (e.g., more open channels) than a second portion. In some cases, a first or second portion is associated with a heater or ignition device (e.g., a glow plug, a burner, and the like). In some cases, a portion configured to preferentially accumulate soot particulates is disposed at an interior, and a heater is disposed within or adjacent to the portion.

Exemplary aftertreatment device 1100 may include a substrate 1110, and may be disposed in an exhaust stream 1120. Substrate 1110 may include a first portion 1130 having a first property, and a second portion 1140 having a second property. Differences in properties may include a different catalyst, a different surface area, a different porosity, a different mean or median pore size, a different permeability, a different thermal expansion coefficient, a different heat capacity, a different thermal conductivity, a different crystal structure, a different amount of amorphous phase, a different chemical composition, and the like. In some embodiments, heater 1022 may be disposed in a first portion, and in certain cases a portion having a heater may have a higher permeability than another portion. In some embodiments, heater 1022 may be activated remotely (e.g., prior to passage of exhaust gas). In some implementations, a flow of exhaust gas activates heater 1022. Heater 1022 may be disposed toward an "interior" of substrate 1110 or an "exterior" of substrate 1110 (e.g., wrapped around). Heater 1022 may be disposed toward an "upstream" portion, a "downstream" portion, or a "middle" portion (with respect to exhaust flow).

In some methods, a heater or other device (e.g., associated with an exhaust aftertreatment system) may be activated prior to or in concert with activation of an engine. A temperature (or other parameter characterizing efficacy) associated with an exhaust aftertreatment system may be determined and/or may be monitored. An activation time associated with activating an engine coupled to the aftertreatment system may be determined (e.g., calculated). An activation time may be a time after which an aftertreatment system is expected to be effective (e.g., have an effective temperature, have a temperature at which lightoff may be triggered, and the like). In some embodiments, an aftertreatment system is "heated" prior to or in concert with passage of exhaust gas passage, and so may reach an operation temperature (e.g., be already "warm") faster than a non-hybrid system. Activating may include at least one of turning on a suction device configured to suck gas into the second end of the hose, and turning on a heater configured to heat at least one of the exhaust stream, the container, the hose, and the substrate. A wireless signal may activate a system.

In some embodiments, an aftertreatment system may include a porous substrate. The porous substrate may have a volume greater than one gallon, greater than 50 gallons, greater than 100 gallons, greater than 500 gallons, or even greater than 1000 gallons. Some substrates may be approximately the size of a refuse dumpster and/or a shipping container. Some substrates may have a volume below $0.1 m^3$. Other substrates may be between 0.1 and $1 m^3$. Certain substrates may be between 1 and $10 m^3$, and some substrates may be greater than 10, or even greater than $100 m^3$ in volume. In some embodiments, a heater may be disposed at an interior of a substrate from which heat transfers relatively slowly. A substrate may comprise cordierite, spinel, mullite, indialite, corundum, aluminum titanate, and/or combinations thereof. A substrate may comprise SiC. A heater may be substantially "constantly" heated (e.g., with a pilot light or low current element) such that a first portion of the substrate remains "warm" (e.g., above 50 C, above 100 C, above 200 C, above 400 C, and the like). In some cases, the first region may be a region having a permeability that results in a preferential flow of exhaust gas through the first region. A substrate may have porosity between 10 and 90%, preferably between 20 and 80%. A substrate may have a mean pore size between 1 and 60 microns. In some aspects, a substrate may have a median pore size between 4 and 22 microns. In certain embodiments, porosity may be between 30-70%, and MPD (mean pore diameter) may be between 5 and 60 microns. For example, a diesel particulate filter may include a material capable of sustained operation at over 400 degrees, cycling to over 1000 degrees, having a porosity between 30 and 60%, having a median pore size between 2 and 30 microns, have a permeability of at least $0.5E-12/m^2$ (preferably greater than $1E-12/m^2$), modulus of rupture greater than 10 Mpa (preferably above 100 MPa), and a thermal expansion coefficient less than $1E-5$/degree Celsius. Bodies and/or fluids may include means to catalyze a reaction. Such means can include a catalyst disposed on a surface of the body, surfaces of the particles, in the fluid, a particular surface treatment or condition associated with the body, and/or combinations thereof. Catalysts may include Group VIII metals, Pt-group metals, rare earth oxides, oxides of Fe, Ni, Co, Mn, Cr, W, Mo, V, Nb, Ta, Re, Cu and mixtures thereof. For example, it may be advantageous to catalyze the decomposition of NOx, the combustion of CO and/or hydrocarbons, the combustion of soot particulates, and other high temperature gas phase reactions by choosing an appropriate catalyst. Catalysts may include Ce, Zr, Ti, Ba, Sr, Ca and/or oxides thereof, including zeolites and mesoporous materials. Catalysts may include sulfides, particularly transition metal or rare earth sulfides. Catalysts may include heterogeneous or homogeneous catalysts. In some aspects, catalysts are organic and/or organometallic. Wash coating a catalyst may be used to apply a catalyst to a body. A catalyst may also be dispersed or dissolved in a fluid and deposited on the body by filtering the catalyst from the fluid with the body. In some aspects, a catalyst is added to the fluid being treated. Channels, tubes, planar passages and the like may provide for substantially unimpeded fluid flow within a substrate, while increasing exposure of the fluid to channel walls. A channel may be blocked, forcing passage through the body material per se (e.g., through a wall to an adjacent channel). In other embodiments, channels are not blocked, and fluids flow freely through the body via the channels. In some embodiments, a substrate may have a wall thickness between channels that is between about 50 microns and 2 mm. A fluid stream may flow into a substrate in a first direction, generally parallel to one or more channels incorporated into the substrate. Alternating channels may be created to maximize the region of the substrate through which the fluid stream can pass. The fluid stream may pass through a first channel into an adjacent channel via a wall between the channels. The substrate may include porosity having a pore size distribution that allows passage of the fluid stream while blocking a substance entrained in the fluid stream (e.g., a gas stream) In certain aspects, the substance may be blocked substantially "within" the substrate (e.g., within the walls). In other aspects, the substance may be blocked substantially at the interface between the substrate and the channel. In certain cases, the substance may form a layer that affects the permeability of the substrate. Some porosity may be anisotropic with respect to (e.g.,) various body dimensions. A pore size distribution may take a variety of forms, including Gaussian, normal, lognormal, multimodal, bimodal, trimodal, skewed, Weibull, or any other desired distribution. Porosity may also be characterized by macroscopic factors (e.g., % porosity, surface area, permeability and the like). Various applications may require different combinations of mean pore diameter and percentage open porosity. A substrate may be regenerated during use, and in some cases, regeneration includes the combustion of particles filtered from a fluid stream passing through the substrate. Regeneration may include oxidizing environments, and may involve temperatures above 400, 500, 600, 700, 800, 900, 1000, or even 1100 degrees. In some aspects, a regeneration temperature includes a range between 600 and 1100 degrees. Regeneration may include backflushing. A substrate may include a filter fabricated from a material having a melting point above 900 degrees Celsius.

The above description is illustrative and not restrictive Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A powertrain control unit configured to control an engine coupled to a load, the powertrain control unit comprising:
    a processor and a computer readable non-transitory storage medium; and
    a location sensor coupled to the processor and configured to identify a geographical location of the engine the powertrain control unit configured to:
    receive location data defining the location of the engine:
    receive a demand for output to be provided by the engine to the load;
    identify a first operating condition that is expected to fulfill the demand, the first operating condition having a first expected emissions profile in an exhaust stream from the engine during operation according to the first operating condition, the first emissions profile including:
        a first amount of a first pollutant, and
        a first amount of a second pollutant;
    identify a second operating condition that is expected to fulfill the demand, the second operating condition identified according to the received location data and having a second emissions profile in the exhaust stream from the engine during operation according to the second operating condition, the second emissions profile including:
        a second amount of the first pollutant that is less than the first amount of the first pollutant, and
        a second amount of the second pollutant; and
    control the engine to fulfill the demand according to the second operating condition.

2. The powertrain control unit of claim 1, wherein the second amount of the second pollutant in the exhaust stream is greater than the first amount of the second pollutant.

3. The powertrain control unit of claim 2, wherein the first pollutant includes a criteria pollutant, and the second pollutant includes $CO_2$.

4. The powertrain control unit of claim 1, wherein the first pollutant includes NOx.

5. An equipment comprising:
    the powertrain control unit of claim 4; and
    an engine coupled to the powertrain control unit.

6. The powertrain control unit of claim 1, wherein the first pollutant includes CO2.

7. A vehicle comprising:
    the powertrain control unit of claim 6; and
    an engine coupled to the powertrain control unit.

8. The powertrain control unit of claim 1, wherein the powertrain control unit is further configured to:
    identify the location as associated with a reduced emissions profile having a constraint on emitted amounts of one or more pollutants;
    identify a modified demand lower than the received demand, the modified demand having an acceptable deviation from the received demand;
    choose a reduced operating condition for operation proximate to the location, the reduced operating condition having the reduced emissions profile while fulfilling the modified demand;
    replace the received demand with the modified demand; and
    control the engine to fulfill the modified demand according to the reduced operating condition.

9. The powertrain control unit of claim 8, wherein the location information associated with the reduced emissions profile comprises at least one of a school, a hospital, a nursing home, and a toll booth.

10. The powertrain control unit of claim 8, wherein the first pollutant includes CO2.

11. The powertrain control unit of claim 1, further configured to control a motor coupled to an energy storage device, wherein at least the second operating condition comprises a combination of engine output and motor output.

12. The powertrain control unit of claim 11, wherein the second operating condition provides a larger amount of output from the motor as compared to the first operating condition.

13. The powertrain control unit of claim 12, wherein the first pollutant includes CO2.

14. A vehicle or equipment comprising:
    the powertrain control unit of claim 1,
    an engine coupled to the powertrain control unit, and
    an aftertreatment system coupled to the engine and powertrain control unit, the aftertreatment system configured to reduce an amount of one or more pollutants in the exhaust stream.

15. The vehicle or equipment of claim 14, wherein the engine comprises a direct injection engine.

16. The vehicle or equipment of claim 15, wherein the vehicle or equipment comprises the vehicle, and the engine comprises an Atkinson cycle engine.

17. A vehicle comprising the powertrain of claim 16, wherein the first pollutant includes CO2.

18. A method for operating a powertrain comprising:
    the powertrain control unit of claim 1; and
    an engine coupled to the powertrain control unit;

the method comprising:
- receiving the demand for output;
- calculating the first emissions profile associated with fulfilling the demand pursuant to the first operating condition;
- calculating the second emissions profile associated with fulfilling the demand pursuant to the second operating condition; and
- controlling the engine to fulfill the demand according to the second operating condition.

19. A vehicle or equipment comprising:
an engine; and
the powertrain control unit of claim 1 coupled to the engine.

20. A vehicle or equipment comprising:
an engine;
a motor;
an energy storage device coupled to the motor; and
the powertrain control unit of claim 11 coupled to the engine and the motor.

\* \* \* \* \*